(12) United States Patent
Hedtke (10) Patent No.: US 9,897,505 B2
(45) Date of Patent: Feb. 20, 2018

(54) PROCESS VARIABLE MEASUREMENT AND LOCAL DISPLAY WITH MULTIPLE RANGES

(71) Applicant: Rosemount Inc., Chanhassen, MN (US)

(72) Inventor: Robert C. Hedtke, Young America, MN (US)

(73) Assignee: Rosemount Inc., Shakopee, MN (US)

( * ) Notice: Subject to any disclaimer, the term of this patent is extended or adjusted under 35 U.S.C. 154(b) by 251 days.

(21) Appl. No.: 14/751,754

(22) Filed: Jun. 26, 2015

(65) Prior Publication Data
US 2016/0377498 A1 Dec. 29, 2016

(51) Int. Cl.
G01L 19/10 (2006.01)
G01L 19/16 (2006.01)
G01K 1/02 (2006.01)

(52) U.S. Cl.
CPC ............. *G01L 19/10* (2013.01); *G01K 1/028* (2013.01); *G01L 19/16* (2013.01)

(58) Field of Classification Search
CPC . G01D 7/02; G01D 7/08; G01D 13/22; G01L 7/00; G01L 19/08; G01L 19/083; G01L 19/086; G01L 19/10; G01L 19/12
USPC ........................................................ 116/201
See application file for complete search history.

(56) References Cited

U.S. PATENT DOCUMENTS

| 7,140,257 | B2 * | 11/2006 | Henson et al. ......... G01L 7/043 73/732 |
| 7,493,813 | B2 | 2/2009 | Nunes et al. |
| 7,559,245 | B2 * | 7/2009 | Knowles et al. ....... F25B 45/00 73/700 |
| 7,612,683 | B2 * | 11/2009 | Takato .................... B60K 35/00 116/47 |
| 8,276,458 | B2 * | 10/2012 | Hedtke ..................... G01D 3/02 73/717 |
| 2008/0190208 | A1 * | 8/2008 | Appler et al. .......... F25B 45/00 73/714 |
| 2008/0216491 | A1 * | 9/2008 | Quest et al. .......... F25B 49/005 62/77 |
| 2010/0162822 | A1 | 7/2010 | Ward |

(Continued)

FOREIGN PATENT DOCUMENTS

JP 2012098059 A * 5/2012 ............... G01D 7/08
WO WO 2012-129245 A1 9/2012

OTHER PUBLICATIONS

International Search Report and Written Opinion for International Patent Application No. PCT/US2016/037805, dated Oct. 14, 2016, date of filing: Jun. 16, 2016, 14 pages.

*Primary Examiner* — R. A. Smith
(74) *Attorney, Agent, or Firm* — Christopher R. Christenson; Kelly, Holt & Christenson PLLC (57) ABSTRACT

A process variable indicator is provided. The process variable indicator includes a process variable sensor having an electrical characteristic that varies with the process variable. Measurement circuitry is coupled to the process variable sensor and is configured to provide an indication relative to the electrical characteristic. A processor is coupled to the measurement circuitry and is configured to compute a process variable based on the indication and determine, among a plurality of ranges, which range the process variable is within. The processor generates a local visual output based on the process variable and the determined range. A method of visually indicating a process variable is also provided.

22 Claims, 6 Drawing Sheets

(56) References Cited

U.S. PATENT DOCUMENTS

2011/0203382 A1* 8/2011 Kim et al. .............. G01L 7/043
                                                              73/732
2014/0239151 A1    8/2014 Schumacher

* cited by examiner

PROCESS VARIABLE MEASUREMENT AND LOCAL DISPLAY WITH MULTIPLE RANGES

BACKGROUND

Mechanical instruments for measuring and displaying process variables, such as pressure or temperature, are widely used throughout the industry. These instruments typically do not require any source of electrical power and display their respective process variable using mechanical techniques. For example, a Bourdon tube device generates movement of a needle in direct response to a pressure change within a Bourdon tube that is exposed to a pressure. Similarly, a temperature measurement device may have a needle that is coupled to a bimetallic strip that is sensitive to changes in temperature. These are simply two examples of ubiquitous mechanical devices that continue to exist in process installations today. By virtue of their mechanical nature, these devices are not affected by power failure and are also relatively inexpensive to produce and deploy.

As the cost of microelectronic components has dropped in recent years, there is now the ability to compete on a cost basis with the mechanical process variable measurement and display devices listed above. However, the industry is generally aware of the abilities and prices of mechanical devices. Thus, as new devices that employ electronic components attempt to compete, they must generally provide additional features at similar or less cost. One way in which such electronic devices have done this is by mimicking the overall display of a mechanical transducing device. For example, a self-powered optical detector for mechanical gauge instruments is provided in US Patent Application Publication Number 20140239151 A1. This device while employing some electronic components, generally mimics the appearance of a Bourdon tube gage.

The discussion above is merely provided for general background information and is not intended to be used as an aid in determining the scope of the claimed subject matter.

SUMMARY

A process variable indicator is provided. The process variable indicator includes a process variable sensor having an electrical characteristic that varies with the process variable. Measurement circuitry is coupled to the process variable sensor and is configured to provide an indication relative to the electrical characteristic. A processor is coupled to the measurement circuitry and is configured to compute a process variable based on the indication and determine, among a plurality of ranges, which range the process variable is within. The processor generates a local visual output based on the process variable and the determined range. A method of visually indicating a process variable is also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Mechanical process variable measurement and display technologies are generally limited in their ability to provide any features beyond their core functionality. In contrast, new process devices that employ electronic components can provide a wealth of new features in comparison to their mechanical counterparts. In accordance with embodiments of the present invention, process variable sensing components that are provided to sense a process variable in conjunction with the process variable display device may have a sensing range of the process variable that is vastly beyond that required by the end user. For example, a user ordering a device to sense pressure between 0 and 200 psi may receive a pressure measurement capsule or component that can accurately sense pressure between 0 and 800 psi simply because that is the most appropriate sensing device for the specified range. However, the end user requirement of an operating range between 0 and 200 psi will cause the manufacturer to provide a printed faceplate for the device that shows pressure arranged regularly at intervals from 0 to 200 psi about the face of the device. If pressure exceeds the 200 psi mark, the needle will simply indicate overpressure by extending beyond the 200 psi mark. However, since the device itself may be capable of accurately sensing pressure from 0 to 800 psi, there is the possibility that important information could be displayed to the user beyond the user's specified upper range limit.

Embodiments of the present invention generally provide two or more process variable ranges on the face of a process variable measuring and indicating device. A first range corresponds with the user-specified operating range. In the example described above, this is 0 to 200 psi range. A second range corresponds to a useful measurement range of the device beyond the user's specified range. In the example given above, this additional range would extend from 200 to 800 psi. This additional range could be provided on a small arc of the display. If the needle goes beyond the 800 psi mark, the device could simply indicate overpressure.

Figure 1:
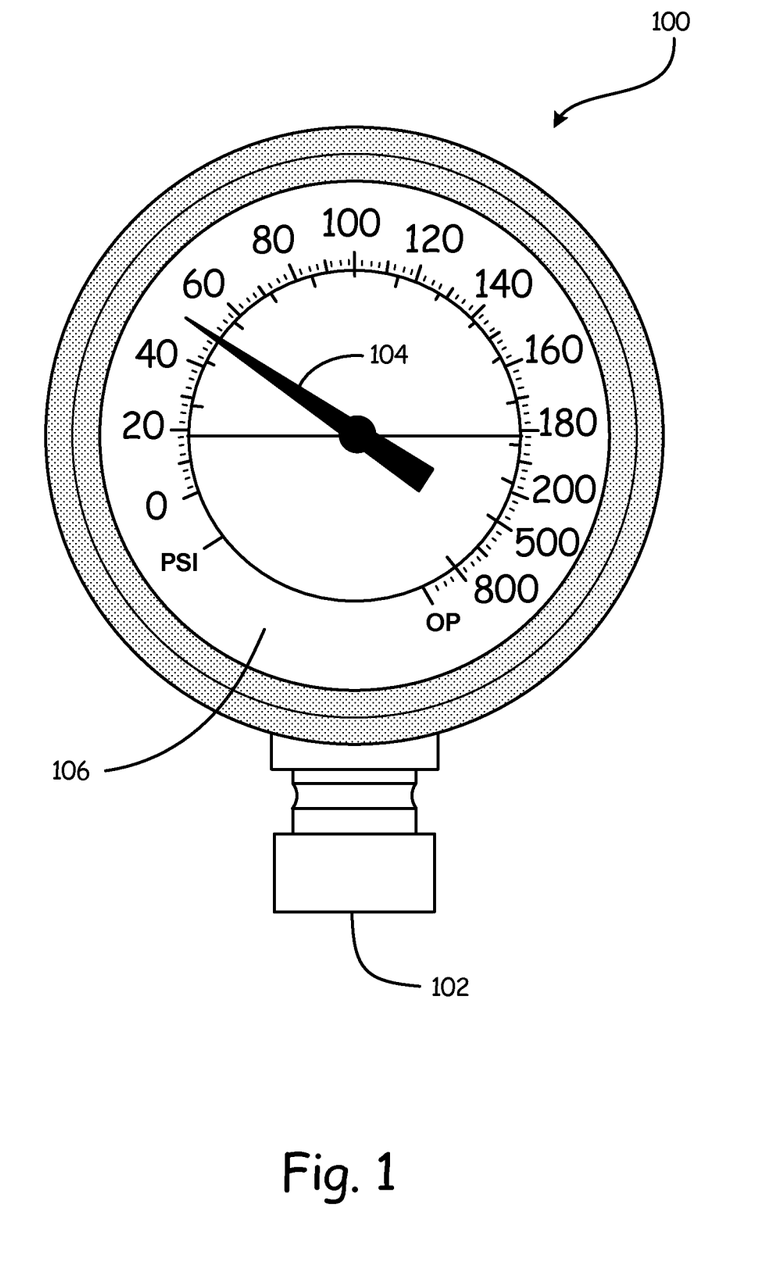
FIG. 1 is a diagrammatic view of a process variable indicator in accordance with an embodiment of the present invention.

FIG. 1 is a diagrammatic view of a process variable indicator in accordance with an embodiment of the present invention. In the example shown in FIG. 1, device 100 indicates a pressure of process fluid coupled to process coupling 102. The pressure of the process fluid generates a change in a pressure sensing component, such as a pressure sensor or pressure sensing capsule. The detected pressure is then correlated to movement of a physical needle 104 sweeping radially across face 106 of device 100. As can be seen, pressure reading between 0 and 200 psi occurs at a substantially regular angular interval. Thus, for a given pressure change within this first interval, the needle will sweep through a first angular change. For example, a pressure change from 20 to 100 psi (80 psi differential) will generate an angular movement of the needle of approximately 90 degrees. However, beyond 200 psi up to 800 psi, a much smaller angular interval is used. In this range, the pressure is beyond the user-specified operating range, but device 100 is still useful at providing an indication of the magnitude pressure. In this range, a given pressure change will generate significantly less angular movement of the needle than when the needle is in the first operating range. Additionally, in the event that the pressure exceeds 800 psi, the needle will sweep clockwise beyond the 800 psi mark and indicate overpressure. Thus, the embodiment shown in FIG. 1 is of a process variable measurement and display device having a physical indicator operating with multiple ranges indicated on its face.

Figure 2:
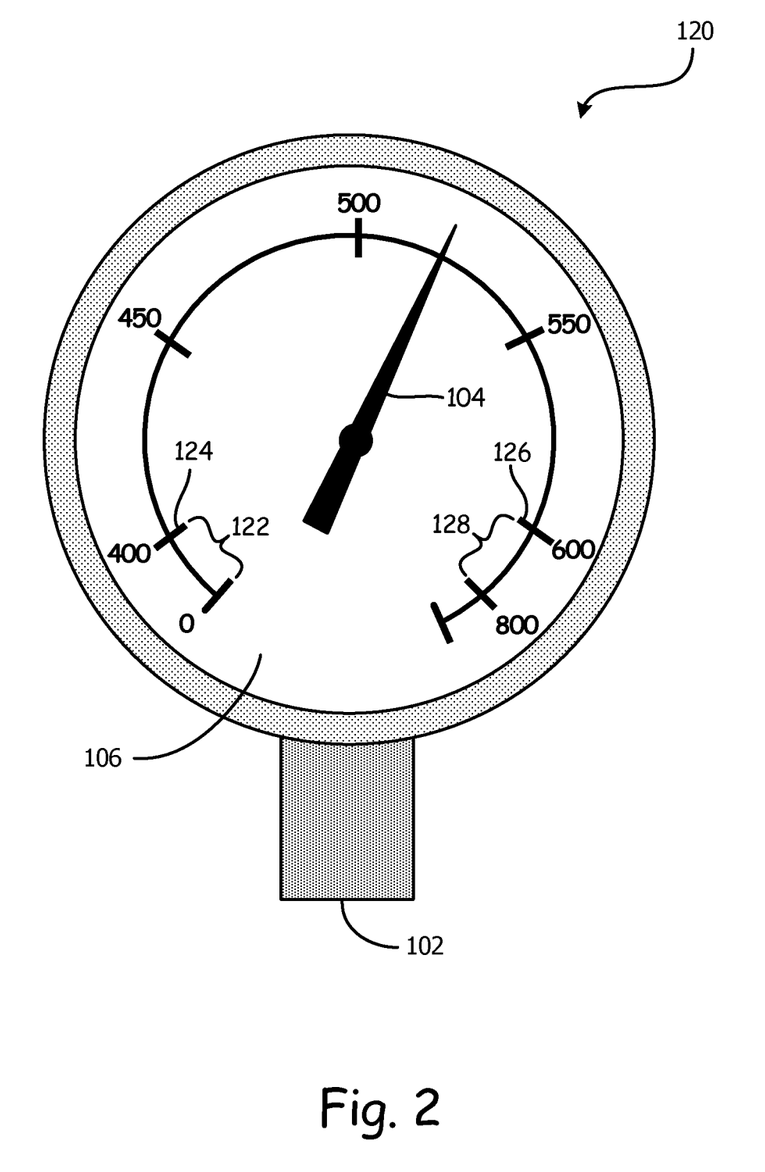
FIG. 2 is a diagrammatic view of a process variable indicator in accordance with another embodiment of the present invention.

FIG. 2 is a diagrammatic view of a process variable indicator in accordance with another embodiment of the present invention. As shown in FIG. 2, device 120 has a process coupling 102 much like the embodiment shown in FIG. 1. Further, device 120 also includes a face 106 and physical indicator (needle 104) that are used to indicate a process variable. However, as shown in FIG. 2, three distinct ranges are provided. The range of process fluid pressure from 0 to 400 psi is indicated by needle 104 being positioned within range 122. Additionally, a second range extending from 400 to 600 psi is shown encompassing the majority of the radial area. As can be seen, this range extends from mark 124 to mark 126 on face 106. Beyond the upper limit of the second range (600 psi), a third range 128 allows needle 104 to continue to show pressure accurately from 600 to 800 psi. Finally, as the pressure exceeds 800 psi, the needle will move clockwise beyond the 800 psi mark and indicate overpressure. FIG. 2 illustrates an example of the customer value for embodiments described herein. The customer can utilize the majority of the meter face to display normal pressures with high resolution. However, the customer also has visibility to abnormal pressures either higher or lower than the normal operating pressure range.

Figure 3:
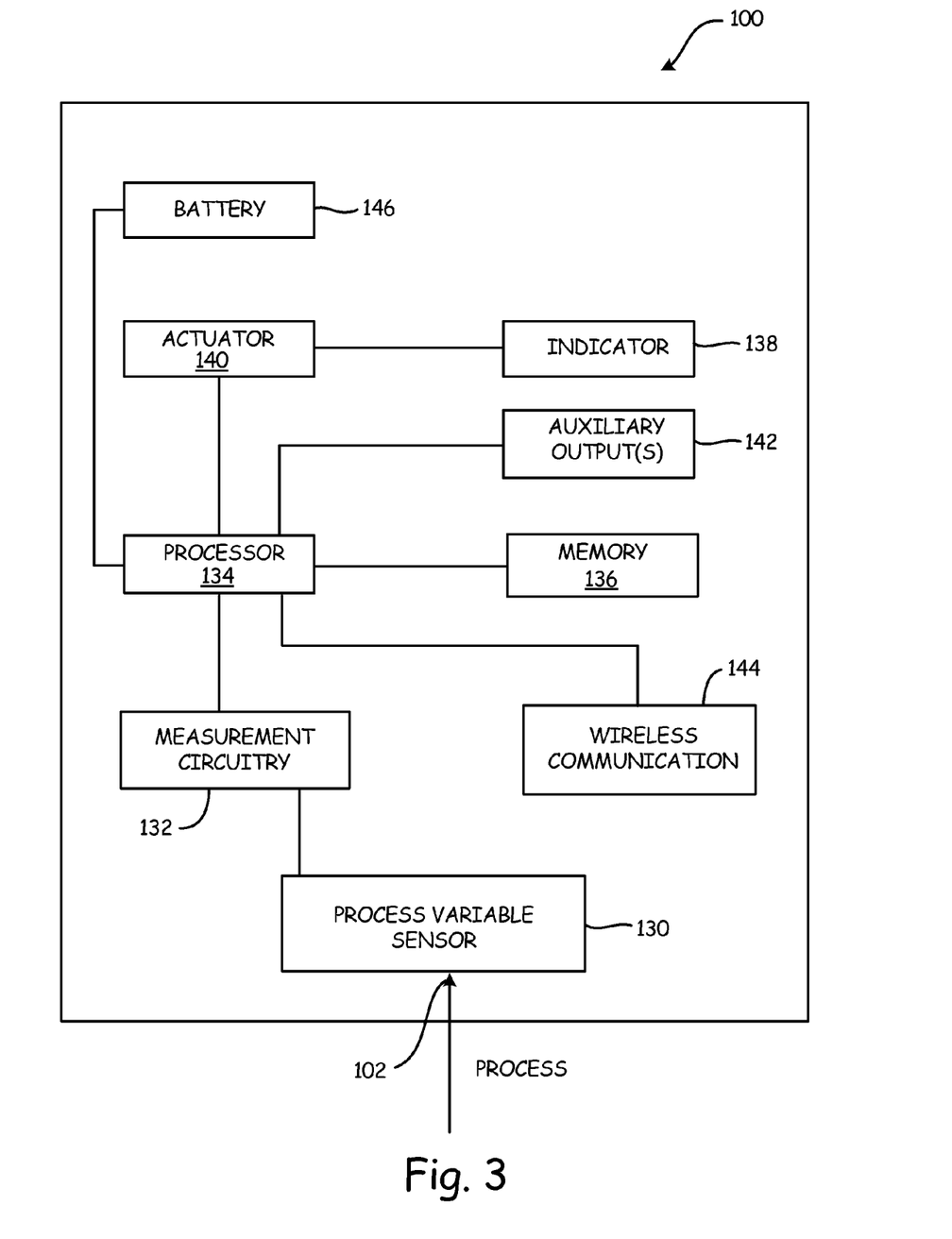
FIG. 3 is a block diagram of a process variable indicator in accordance with an embodiment of the present invention.

FIG. 3 is a block diagram of a process variable indicator in accordance with an embodiment of the present invention. Device 100 includes process inlet 102 that is configured to convey pressure of a process fluid, such as a liquid or a gas, to a process variable sensor 130 disposed within device 100. In embodiments where device 100 senses process fluid pressure, process variable sensor 130 is a pressure sensor. For example, pressure sensor 130 may be a strain-gage attached to a deformable diaphragm or other suitable structure that deforms in response to process fluid pressure. This deformation then changes the resistance of the strain-gauge. The resistance is measured by circuitry within device 100 in order to detect the process fluid pressure.

Similarly, in embodiments where the process variable is temperature, process variable sensor 130 may be any suitable temperature sensing device, such as a resistance temperature device (RTD), thermocouple, thermistor, or other suitable device.

As can be appreciated, any suitable sensing arrangement can be used for process variable sensor 130 in accordance with embodiments of the present invention. Generally, however, process variable sensor 130 has an electrical characteristic that varies with some process variable of interest. Examples of process variables include pressure, temperature, flow, level, pH, et cetera.

Device 100 includes measurement circuitry 132 coupled to process variable sensor 130. Measurement circuitry 132 may include a known analog-to-digital converter as well as any suitable amplification, and/or linearization circuitry. Measurement circuitry 132 provides a digital indication of the electrical characteristic of process variable sensor 130 to processor 134. Processor 134 may be any suitable electrical component that is able to interact with measurement circuitry 132 and provide suitable outputs for the local display 138, as well as any axillary outputs 142. In one embodiment, processor 134 includes a microprocessor. Processor 134 is coupled to or includes non-volatile memory 136 that stores information relative to a plurality of process variable ranges within which a local indication is provided. Note, in some embodiments processor 134, measurement circuitry 132 and memory 136 may be combined on a single integrated circuit or application specific integrated circuit. Processor 134 interacts with measurement circuitry 132 to receive the digital indication of the electrical characteristic of the process variable sensor and computes a process variable, such as process fluid pressure or process fluid temperature based on the digital indication.

The process variable computed or obtained by processor 134 is then indicated locally by device 100 via indicator 138. In one embodiment, indicator 138 is a physical structure that is caused to move on a display face of device 100. In the example shown in FIG. 1, indicator 138 includes needle 104 that is caused to rotationally sweep across the face 106 of device 100 to indicate pressure. Indicator 138 is caused to physically move in order to indicate the process variable by virtue of processor 134 interacting with actuator 140. Actuator 140 can be any suitable component that can receive one or more signals from processor 134 and generate associated movement. In one embodiment, actuator 140 may be a commercially available stepper motor. However, a variety of other suitable movement systems can be employed in accordance with the embodiments described herein. In the example shown in FIG. 3, one or more auxiliary outputs 142 are also coupled to processor 134. These outputs 142 can take any suitable form, but are generally provided in the form of one or more LEDs proximate face 106 of device 100. These auxiliary outputs can indicate simple conditions such as low-battery, the detection of an over-range variable, such as an overpressure or over temperature, or any other suitable condition.

In some embodiments, device 100 may also include wireless communication module 144 coupled to processor 134. Wireless communication module 144 is preferably a wireless transceiver or a wireless transponder for sending and receiving wireless transmissions. Alternatively, wireless communication module 144 may include only a wireless transmitter. Wireless communication module 144 can allow processor 134 to communicate with one or more remote devices. In one embodiment, wireless communication module 144 can provide wireless communication in accordance with a wireless process communication protocol, such as IEC 62591. Such communication can include the provision of process variable information as well as any auxiliary information. Further, additional information that is not easily provided by indicator 138 and/or auxiliary outputs 142 can still be provided via wireless communication module 144. Such information can include more sophisticated diagnostic information, configuration information, et cetera.

FIG. 3 shows device 100 being powered by battery module 146. Battery module 146 can employ any suitable battery technology using either replaceable or non-replaceable battery cells.

As set forth above, embodiments of the present invention generally rely upon an internal battery to power not only the circuitry that measures the process variable, but also the actuator 140 that moves a physical indicator 138. Thus the conversation of electrical energy is very important since it directly affects how long the device will function without requiring a replacement battery. One scenario where an undue amount of electrical energy can be expended is the movement of the physical indicator as it traverses the boundary between ranges. It is possible, in some circumstances, that if the physical indicator sits virtually at the range boundary, the actuator 140 will undergo jitter or other similar movements that may consume valuable electrical resources without providing any useful benefit.

Figure 4:
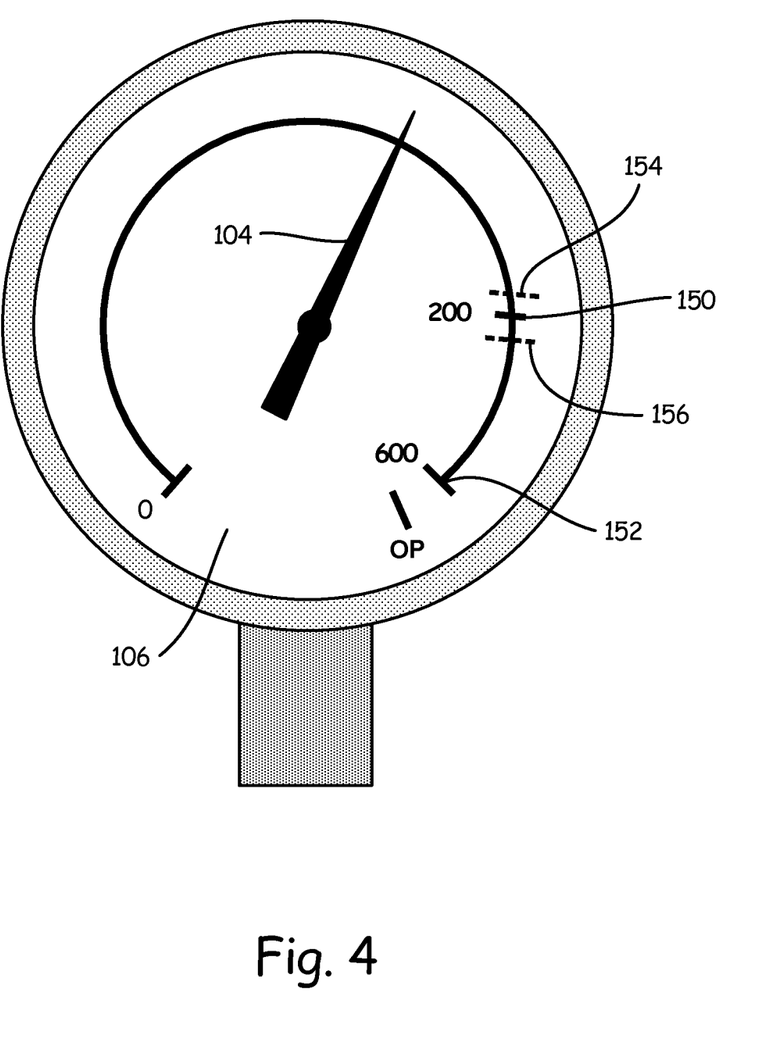
FIG. 4 is a diagrammatic view of a process variable indicator having a plurality of thresholds relative to a range boundary in accordance with an embodiment of the present invention.

In order to reduce the occurrence of actuator jitter, some embodiments of the present invention include a pair of threshold values for each boundary transition. In the embodiment shown in FIG. 4, a range boundary transition occurs at 200 psi. Thus, indicator 138 (needle 104) moves with a first relationship between radial position of needle 104 and face 106 when the process fluid pressure is between 0 and 200 psi. When process fluid pressure reaches 200 psi, a different movement relationship is provided. Thus, the additional 400 psi is indicated within the range shown from lines 150 to 152. When the process fluid pressure reaches 200 psi, processor 134 will, cause actuator 140 to move with fewer degrees per measured pressure change. In order to reduce the potential for actuator jitter at 200 psi, device 100 includes a first threshold value 154 and a second threshold value 156 that is higher than the first threshold value 154. Second threshold value 156 is the threshold consulted by processor 134 in memory 136 when pressure is increasing. Conversely, once the second pressure range has been achieved, processor 134 will switch back to the first pressure range when the pressure falls to first threshold 154. In this way, potential actuator jitter is eliminated. The distance between thresholds 154 and 156 can be set based on the application as desired. However, the provision of a pair of thresholds relative to a single range boundary within memory 136 provides this advantage.

Figure 5:
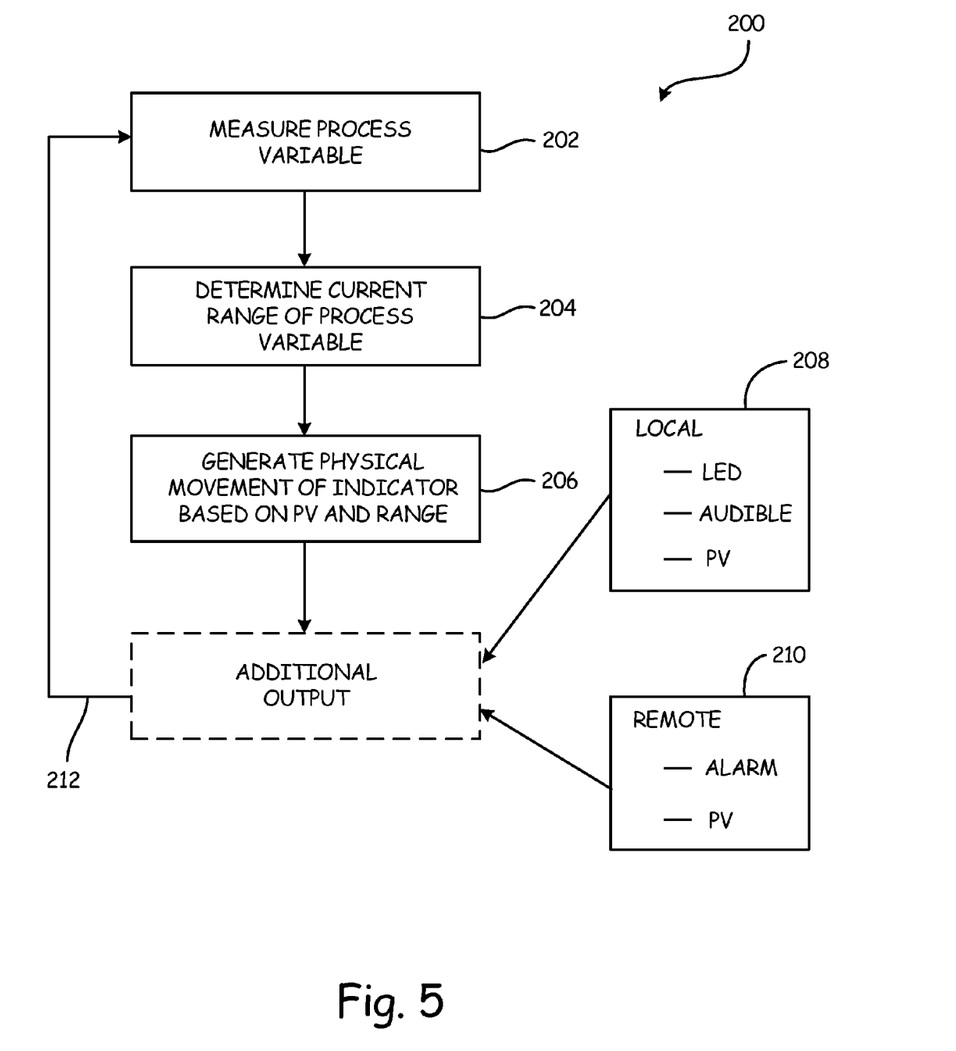
FIG. 5 is a diagrammatic view of a method of measuring and indicating a process variable in accordance with an embodiment of the present invention.

FIG. 5 is a diagrammatic view of a method of measuring and indicating a process variable in accordance with an embodiment of the present invention. Method 200 begins at block 202 where a process variable is measured using a process variable sensor. The measurement of the process variable can occur in any suitable manner including causing an analog-to-digital converter to interact with a process variable sensor having an electrical characteristic that varies in response to a change in the process variable. Next, at block 204, it is determined whether the measured process variable falls within one of a plurality of potential process variable ranges. As set forth above, ranges can include 0-200 psi, 200-600 psi, 0-100° C., et cetera. Once the range for the measured process variable has been determined, physical movement appropriate for indicating the process variable within the identified range is calculated and provided to a suitable actuator, such as actuator 140 (shown in FIG. 3) in order to move a physical indicator. This is shown at reference numeral 206. Additionally, any suitable additional outputs can be provided by the device either locally 208 or remotely 210, or both. Examples of local indications include one or more LEDs, an audible alarm or indication, or an alphanumeric indication of a process variable. Examples of remote indication include alarm and/or process variable information being conveyed wirelessly, such as via wireless communication module 144, to any suitable device. This measurement and display process continues, as indicated at loop 212.

Embodiments described thus far generally mimic a physical mechanical indicator using electronic components and technology. This similarity of devices in accordance with embodiments of the present invention to prior mechanical indicators is believed to facilitate market adoption. So much is this similarity that it is generally preferred that the face of the device, such as face 106, be a pre-printed surface. Thus, the additional ranges in accordance with embodiments described herein are generally printed on a circular face that is assembled into the device. Certainly, embodiments of the present invention can be practiced where the display itself is an electronic component.

Figure 6:
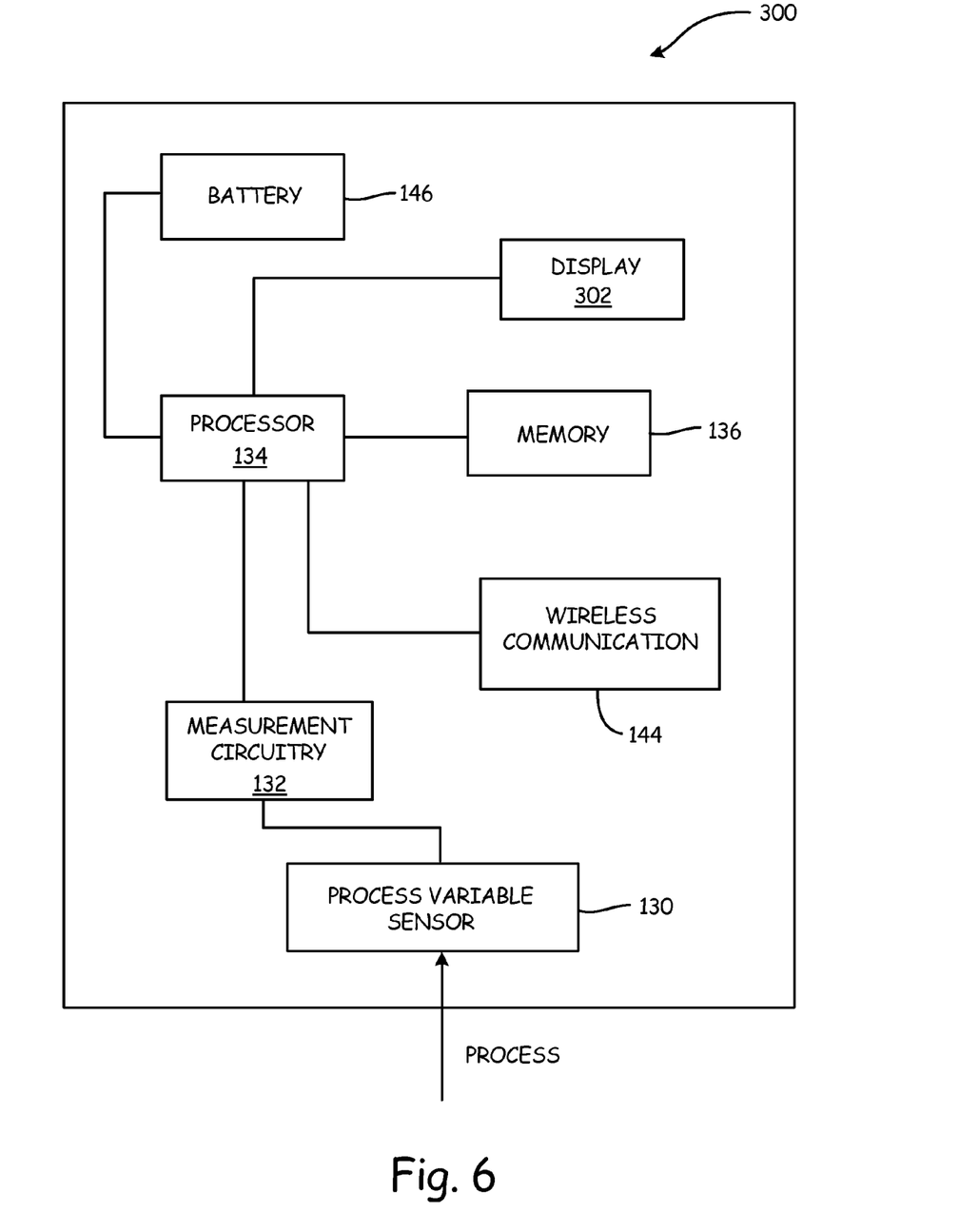
FIG. 6 is a diagrammatic view of a process variable indicator in accordance with another embodiment of the present invention.

FIG. 6 is a diagrammatic view of a process variable indicator in accordance with another embodiment of the present invention. Device 300 includes many components that are similar to device 100 (shown in FIG. 3) and like components are numbered similarly. The main difference between the embodiment shown in FIG. 6 and that of FIG. 3 is that actuator 140 and physical indicator 138 of FIG. 3 are replaced by display device 302 in FIG. 6. Display device 302 replaces both face 106 and indicator 138 with a graphical display that can indicate both range information and provide a dynamic indicator showing the process variable as well as any other suitable information. For example, display device 302 may provide a pictorial version of needle 104 via a graphical display. Thus, the range information as well as the needle itself may be generated by the graphical display 302. In one embodiment, display 302 is a low-power display such as commercially-available e-ink technology. However, embodiments can be practiced where display 302 includes a liquid crystal display, or any other suitable display technology. Certainly, display technologies that utilize relatively low power are preferred in that they conserve the life of battery 146.

Although the present invention has been described with reference to preferred embodiments, workers skilled in the art will recognize that changes may be made in form and detail without departing from the spirit and scope of the invention.

What is claimed is:

1. A process variable indicator comprising:
   a process variable sensor having an electrical characteristic that varies with the process variable;
   measurement circuitry coupled to the process variable sensor and configured to provide an indication relative to the electrical characteristic;
   a visual output interface with a plurality of numerical indicators comprising a first range and a second range, wherein the first range comprises a first interval between numerical indicators, the second range comprises a second interval between numerical indicators, and the first and second intervals are different; and
   a processor coupled to the measurement circuitry, the processor being configured to compute a process variable based on the indication and determine; among a plurality of ranges, that the process variable is within the first range and generate a local visual output on the visual output interface of the process variable within the first range.

2. The process variable indicator of claim 1, and further comprising a wireless communication module coupled to the processor to communicate with a remote device wirelessly.

3. The process variable indicator of claim 2, wherein generating the local visual output includes interacting with an actuator to cause movement of a physical indicator.

4. The process variable indicator of claim 3, and further comprising a pre-printed face disposed proximate the physical indicator, the pre-printed face having indicia indicative of the first and second ranges.

5. The process variable indicator of claim 4, wherein the processor causes the physical indicator to move a first amount relative to a process variable difference in the first range, and move a second amount, different than the first amount, for the process variable difference in the second range.

6. The process variable indicator of claim 5, wherein the physical indicator comprises a needle.

7. The process variable indicator of claim 6, wherein the needle is rotatable to indicate the process variable.

8. The process variable indicator of claim 3, wherein the actuator is a stepper motor.

9. The process variable indicator of claim 2, and further comprising at least one auxiliary output configured to indicate a condition different than the process variable.

10. The process variable indicator of claim 9, wherein the condition is a low-battery condition.

11. The process variable indicator of claim 9, wherein the condition is indicative of the occurrence of an excessive process variable.

12. The process variable indicator of claim 1, wherein the process variable is process fluid pressure.

13. The process variable indicator of claim 12, wherein the process variable sensor is a strain-gauge process fluid pressure sensor.

14. The process variable indicator of claim I, wherein the process variable is temperature.

15. The process variable indicator of claim 1, wherein the processor is configured to access memory containing information indicative of the first and second ranges.

16. The process variable indicator of claim 15, wherein the memory includes a plurality of thresholds relative to each range boundary.

17. The process variable indicator of claim 1, and further comprising an internal battery configured to power the process variable indicator.

18. The process variable indicator of claim 1, and further comprising a graphical display device coupled to the processor and configured to provide the local visual output.

19. A method of visually indicating a process variable, the method comprising:
   obtaining process variable information from measurement circuitry;
   determining a current range containing the process variable, among a plurality of ranges; and
   causing an actuator to move a physical indicator, on a visual interface associated with the measurement circuitry, based on the process variable information and the current range containing the process variable, wherein the visual interface comprises the plurality of ranges, and wherein causing the actuator to move the physical indicator comprises the physical indicator moving into the current range on the visual interface.

20. The method of claim 19, wherein causing the actuator to move a physical indicator includes energizing a stepper motor to cause movement of the physical indicator.

21. The method of claim 19, wherein Obtaining process variable information includes measuring an electrical characteristic of a process variable sensor.

22. The method of claim 19, and further comprising wirelessly communicating the process variable information.

* * * * *

UNITED STATES PATENT AND TRADEMARK OFFICE
CERTIFICATE OF CORRECTION

PATENT NO. : 9,897,505 B2  
APPLICATION NO. : 14/751754  
DATED : February 20, 2018  
INVENTOR(S) : Robert C. Hedtke It is certified that error appears in the above-identified patent and that said Letters Patent is hereby corrected as shown below:

In the Claims

Column 6 Claim 1, Line 53, after the word "determine" should be a "," not a ";"

Column 7 Claim 14, Line 27, "claim I" should be "claim 1"

Column 8 Claim 21, Line 26, "Obtaining" should be "obtaining"

Signed and Sealed this  
Twelfth Day of June, 2018

Andrei Iancu  
*Director of the United States Patent and Trademark Office*